(12) United States Patent
Giebel et al.

(10) Patent No.: US 7,126,734 B1
(45) Date of Patent: Oct. 24, 2006

(54) MOTOR DRIVE CIRCUIT WITH REDUCED COIL CROSSTALK IN A FEEDBACK SIGNAL INDICATIVE OF MIRROR MOTION IN LIGHT SCANNING ARRANGEMENTS

(75) Inventors: James Giebel, Centerport, NY (US); Costanzo Difazio, East Patchogue, NY (US); Mark A. Weitzner, Plainview, NY (US)

(73) Assignee: Symbol Technologies, Inc., Hortsville, NY (US)

( * ) Notice: Subject to any disclaimer, the term of this patent is extended or adjusted under 35 U.S.C. 154(b) by 0 days.

(21) Appl. No.: 11/254,091

(22) Filed: Oct. 19, 2005

Related U.S. Application Data

(60) Provisional application No. 60/716,302, filed on Sep. 12, 2005.

(51) Int. Cl.
*G02B 26/08* (2006.01)

(52) U.S. Cl. ..................................... 359/199; 359/213
(58) Field of Classification Search .................... None
See application file for complete search history.

(56) References Cited

U.S. PATENT DOCUMENTS

| 4,160,913 A | * | 7/1979 | Brenholdt | 250/559.49 |
| 2006/0065735 A1 | * | 3/2006 | Li et al. | 235/462.36 |

* cited by examiner

*Primary Examiner*—James Phan
(74) *Attorney, Agent, or Firm*—Kirschstein, et al.

(57) ABSTRACT

Crosstalk between a drive coil and a feedback coil is eliminated by a motor drive circuit operative for generating the drive coil as a square wave, and by removing the crosstalk which occurs at zero transitions of a feedback signal. The drive coil is used to oscillate a scan mirror employed in an image projection arrangement or an electro-optical reader.

14 Claims, 4 Drawing Sheets

MOTOR DRIVE CIRCUIT WITH REDUCED COIL CROSSTALK IN A FEEDBACK SIGNAL INDICATIVE OF MIRROR MOTION IN LIGHT SCANNING ARRANGEMENTS

CROSS. REFERENCE TO RELATED APPLICATION

This application claims the benefit of U.S. Provisional Patent Application Ser. No. 60/716,302, filed Sep. 12, 2005, commonly assigned herewith.

BACKGROUND OF THE INVENTION

1. Field of the Invention

The present invention generally relates to monitoring the motion of a scan mirror employed for sweeping a light beam in electro-optical readers for reading indicia such as bar code symbols, or in image projectors for displaying images and, more particularly, to a motor drive circuit with reduced coil crosstalk in a feedback signal indicative of such mirror motion.

2. Description of the Related Art

Electro-optical readers are well known in the art for electro-optically transforming a spatial pattern of graphic indicia, known as a symbol, into a time-varying electrical signal which is then decoded into data. Typically, a light beam generated from a light source is focused by a lens along an optical path toward a target that includes the symbol. The light beam is repetitively swept along a scan line or a series of scan lines arranged in a raster pattern over the symbol by moving a scan mirror located in the optical path. A photodetector detects light scattered or reflected from the symbol and generates an analog electrical signal. Electronic circuitry converts the analog signal into a digitized signal having pulse widths corresponding to physical widths of bars and spaces comprising the symbol, and a decoder decodes the digitized signal into data descriptive of the symbol.

The repetitive sweeping of the light beam is performed by a drive, typically a motor having a rotor oscillatable about an axis. A permanent magnet and the scan mirror are jointly oscillatable with the rotor. The motor is driven by a drive coil wound on a bobbin that is located physically close to the permanent magnet. A feedback coil is also wound on the same bobbin. In response to an alternating voltage drive signal applied to the drive coil, the electromagnetic field produced by the drive coil interacts with the permanent magnetic field of the magnet, thereby jointly moving the magnet and the mirror. The frequency of the drive signal in the drive coil is the same as the rotor motion, with one cycle of the drive signal corresponding to one cycle of rotor motion. The amplitude of the drive signal in the drive coil is proportional to the velocity of the rotor motion. The polarity of the drive signal in the drive coil is dependent on the direction of rotor motion such that a positive half cycle of the drive signal indicates that the rotor is moving in one drive direction, and a negative half cycle indicates that the rotor is moving in the opposite drive direction. Zero crossings of the drive signal occur when the rotor reaches its maximum travel at each end of a respective scan line. At each zero crossing, the rotor stops for an instant and reverses drive direction.

The feedback coil is useful for a variety of purposes. It generates an alternating voltage signal, known as a feedback signal, due to the movement of the magnet. The frequency and polarity of the feedback signal generated in the feedback coil corresponds to the frequency and polarity of the drive signal. An electrical drive monitoring circuit is often employed to monitor the amplitude of the feedback signal and, for example, turn the light source off if the amplitude falls below a predetermined threshold, thereby indicating that the drive is malfunctioning. An electrical closed loop control circuit is also often employed to process the feedback signal to make decisions about how to continue driving the motor. Still another electronic circuit that is often employed processes the zero crossings of the feedback signal to derive a start-of-scan (SOS) signal that represents rotor motion and is used to synchronize the scan lines.

Although generally satisfactory for its intended purpose, the use of the feedback coil for monitoring for drive failure, for driving the drive motor, and for generating the SOS signal causes problems. There is undesirable magnetic coupling or crosstalk between the drive and feedback coils. To remove such unwanted coupled signals and the resulting noise and distortion, electronics are usually added to actively cancel and filter the coupled signals, and filtering is necessary to ensure control loop stability. Without such filtering, the loop would oscillate based on feedback through the coils, thereby impairing motor malfunction detection. The filtering also changes the frequency of the electromechanical system, thereby causing the motor to oscillate off its natural or resonant frequency, and thereby impairing the drive efficiency. Since filtering introduces phase delays, the SOS signal will never represent the true position of a beam spot of the scanning light beam relative to the leading bars and spaces in a target symbol. This problem is solved in the art by adding and adjusting electronics to advance or delay the SOS signal depending on the type of motor used. The art has also proposed the use of optical feedback circuits. In addition, when the feedback coil is coupled to the drive coil, an annoying buzzing sound is sometimes generated.

Another arrangement, other than a symbol reader, that repetitively scans a light beam in a raster pattern over a target is an image projector for projecting an image on a display surface, for example, a screen. Typically, one or more energizeable lasers of different wavelengths project respective laser beams toward the screen, while an oscillating drive sweeps the beams in scan lines over the screen. Usually, a pair of scan mirrors is employed to sweep the beams in mutually orthogonal directions. The lasers are energized and deenergized during each sweep to create a bit-mapped image on the screen for viewing. As in the case of readers, at least one of these scan mirrors is oscillated by a drive which includes a motor having feedback and drive coils, as described above, with their attendant problems of cross-coupled signals, extra hardware, phase delays and annoying sounds. Crosstalk is a more severe problem in image projectors, because the motion or velocity of the scan mirror and, hence, of each scan line swept by the scan mirror must be very highly controlled to be a constant value for both right-to-left and left-to-right scan lines. Otherwise, the projected image will be degraded.

SUMMARY OF THE INVENTION

Objects of the Invention

Accordingly, it is a general object of this invention to provide a motor drive circuit with reduced coil crosstalk in a feedback signal in light scanning arrangements, such as electro-optical readers and image projectors.

More particularly, it is an object of the present invention to monitor motion of a scan mirror to a high degree of accuracy.

Still another object of the present invention is to reliably enable drive failure to be monitored, to reliably ensure control loop stability, to reliably generate SOS signals without phase delays, and to reliably eliminate annoying sounds in such light scanning arrangements without the feedback signal being contaminated by crosstalk.

It is yet another object of the present invention to reliably regulate scan amplitude of a motor.

A still further object of the present invention is to improve motor drive efficiency.

Features of the Invention

In keeping with the above objects and others which will become apparent hereinafter, one feature of the present invention resides, briefly stated, in an arrangement for, and a method of, monitoring motion of a scan mirror used for sweeping a light beam by employing a motor drive circuit for generating a feedback signal indicative of such motion and uncontaminated by crosstalk.

The arrangement may be employed in an electro-optical reader in which case the light beam is swept as one or more scan lines across a symbol, preferably a one- or two-dimensional symbol. The arrangement could also be used in an image projector in which case the light beam is swept in a raster pattern of scan lines across a screen on which an image is viewable. In either case, the light beam is moved by an electrical motor having a rotor on which the scan mirror is mounted for oscillating movement. A permanent magnet having a permanent magnetic field is mounted on the mirror for joint movement therewith. A drive signal is applied to a drive coil which generates an electromagnetic field that interacts with the permanent field to oscillate the magnet and the mirror in opposite drive directions to generate a raster pattern of scan lines which extend in mutually orthogonal scan directions over a target. In the case of the reader, a portion of the light derived from the scan lines and scattered by the symbol is processed to read the symbol. In the case of the projector, the light source is energized and deenergized during travel of the beam along each scan line to create the image on the target screen.

A feedback coil is wound in the motor in proximity with the magnet for generating a feedback signal indicative of joint motion of the mirror and the magnet. However, the feedback coil is in close proximity with the drive coil and is contaminated by crosstalk with the drive signal.

In accordance with this invention, the motor drive circuit generates the drive signal as a square wave. Crosstalk occurs only when the amplitude of the drive signal changes and, in the case of a square wave, this occurs only at the vertical edges of the square wave. A track and hold circuit processes the corrupted feedback signal and is controlled by an edge-triggered one shot circuit which generates a command signal at each zero crossing of the corrupted feedback signal. Since the crosstalk is only present at each zero crossing, the command signal effectively removes the crosstalk. An uncorrupted feedback signal is thus output from the track and hold circuit. This uncorrupted feedback signal can be used to generate the square wave drive signal.

In accordance with this invention, cancellation circuitry for cross-coupled signals is unnecessary. Accuracy of the feedback signal is improved. The feedback signal has no phase delays. There are no annoying sounds related to transformer coupling between coils. The entire circuitry for monitoring mirror motion can be implemented in an application specific integrated circuit (ASIC).

In brief, the crosstalk-reduced feedback signal is an accurate representation of motor position and velocity and, hence, of beam position. The crosstalk-reduced feedback signal is not corrupted due to signal feedthrough between the drive and feedback coils. Performance of the image projector or the reader is enhanced.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
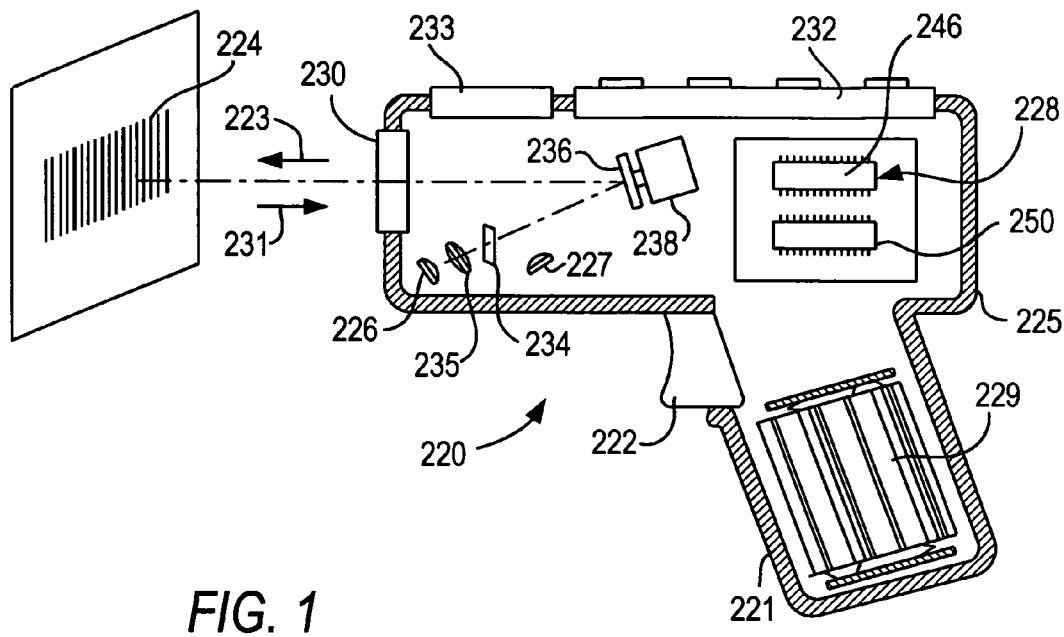
FIG. 1 is a diagrammatic view of a hand-held instrument for electro-optically reading indicia.

Reference numeral 220 in FIG. 1 identifies an electro-optical reader for electro-optically reading indicia, such as bar code symbol 224, located in a range of working distances therefrom. The reader 220 has a pistol grip handle 221 and a manually actuatable trigger 222 which, when depressed, enables a light beam 223 to be directed at the symbol 224. The reader 220 includes a housing 225 in which a light source 226, a light detector 227, signal processing circuitry 228, and a battery pack 229 are accommodated. A light-transmissive window 230 at a front of the housing enables the light beam 223 to exit the housing, and allows light 231 scattered off the symbol to enter the housing. A keyboard 232 and a display 233 may advantageously be provided on a top wall of the housing for ready access thereto.

In use, an operator holding the handle 221 aims the housing at the symbol and depresses the trigger. The light source 226 emits a light beam which is optically modified and focused by an optical focusing assembly 235 to form a beam spot on the symbol 224. The beam passes through a beam splitter 234 to a scan mirror 236 which is repetitively oscillated at a scan rate of at least 20 scans a second by a motor drive 238. The scan mirror 236 reflects the beam incident thereon to the symbol 224 and sweeps the beam spot in scans across the symbol in a scan pattern. The scan pattern can be a scan line extending lengthwise along the symbol along a scan direction, or a series of scan lines arranged along mutually orthogonal directions, or an omni-directional pattern, just to name a few possibilities.

The reflected light 231 has a variable intensity over the scan pattern and passes through the window 230 onto the scan mirror 236 where it is reflected onto the splitter 234 and, in turn, reflected to the photodetector 227 for conversion to an analog electrical signal. The signal processing circuitry 228 digitizes and decodes the signal to extract the data encoded in the symbol.

Figure 2:
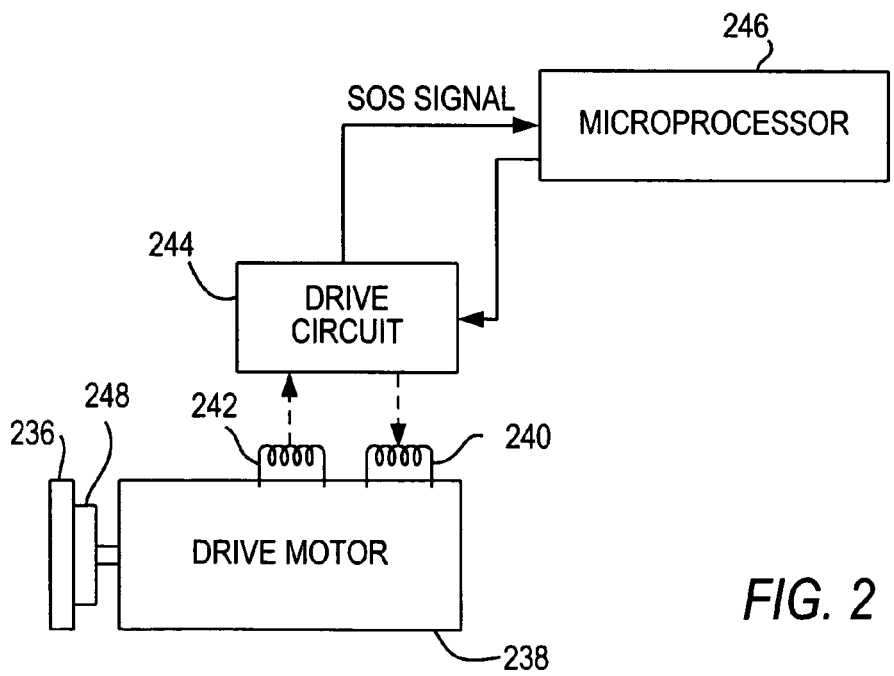
FIG. 2 is a block diagram of some of the components in the instrument of FIG. 1.

The drive motor 238 is shown in more detail in FIG. 2 with a drive coil 240 and a feedback coil 242 both wound on a common bobbin. The signal processing circuitry 228 includes a control microprocessor 246 operative for sending a control signal to a drive circuit 244 which, in turn, sends a drive signal to the drive coil 240 to generate an electromagnetic field that interacts with a permanent magnet 248 and drives the motor 238.

The feedback coil 242 also interacts with the magnet and generates an electrical feedback signal of the same frequency as the drive signal and is useful for a variety of purposes. For example, the drive circuit 244 includes an error amplifier in a closed loop circuit for adjusting the amplitude of the drive signal fed to the drive coil. Also, the feedback signal is used to derive the SOS signal described above, and is fed to the microprocessor. In addition, the feedback signal is used to monitor for drive failure.

Figure 3:
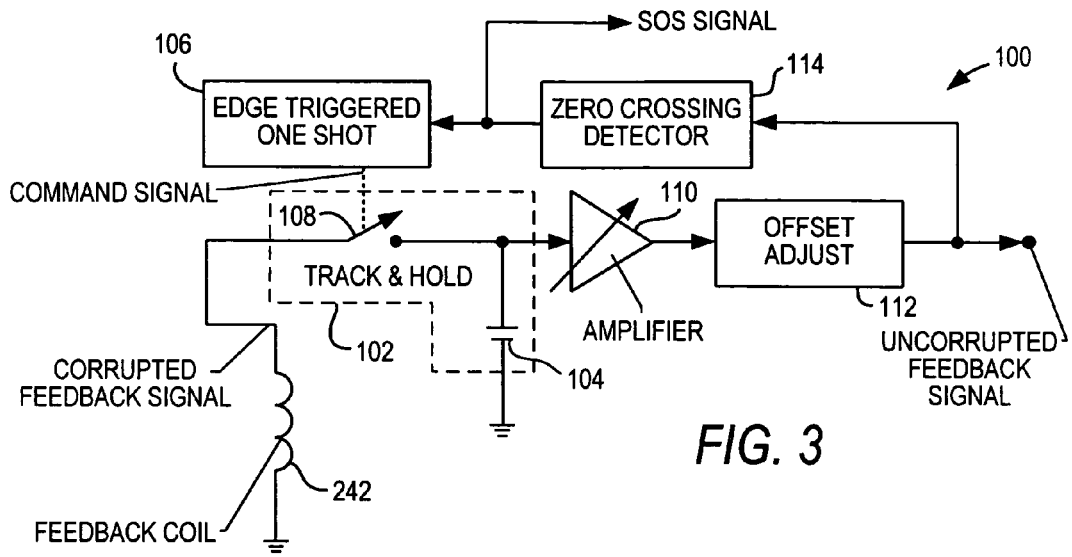
FIG. 3 is a block diagram further detailing the arrangement of FIG. 2.
Figure 4:
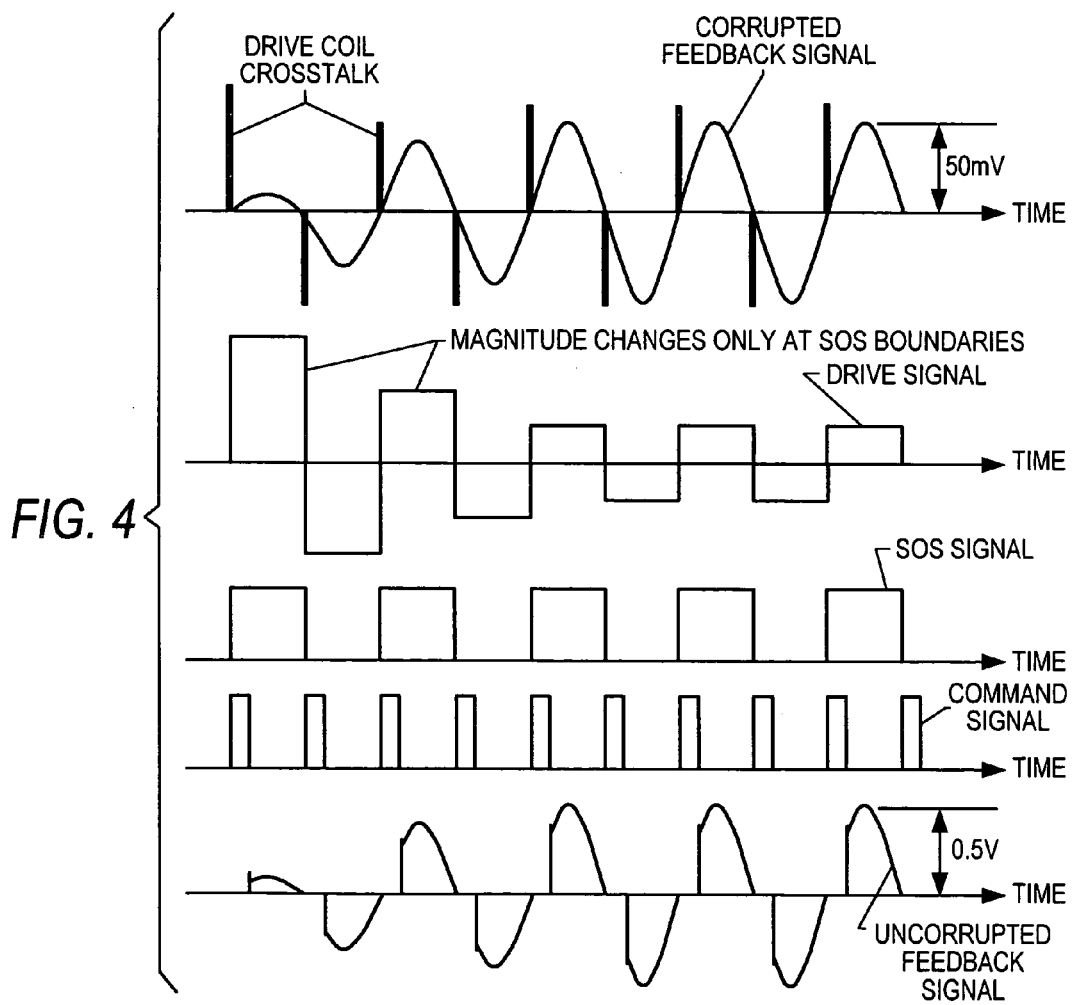
FIG. 4 is a series of signals generated in the circuit of FIG. 3.
Figure 5:
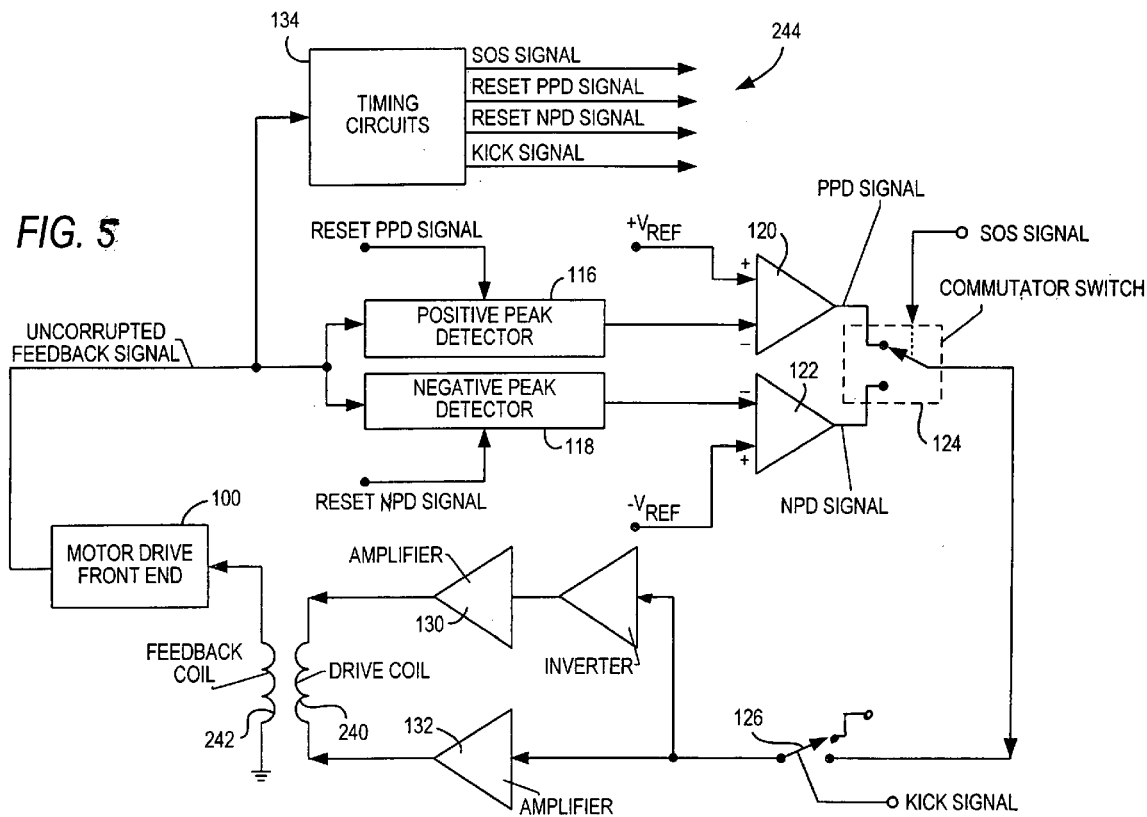
FIG. 5 is a block diagram of the arrangement of FIG. 2 with additional components for use in the instrument of FIG. 1.
Figure 6:
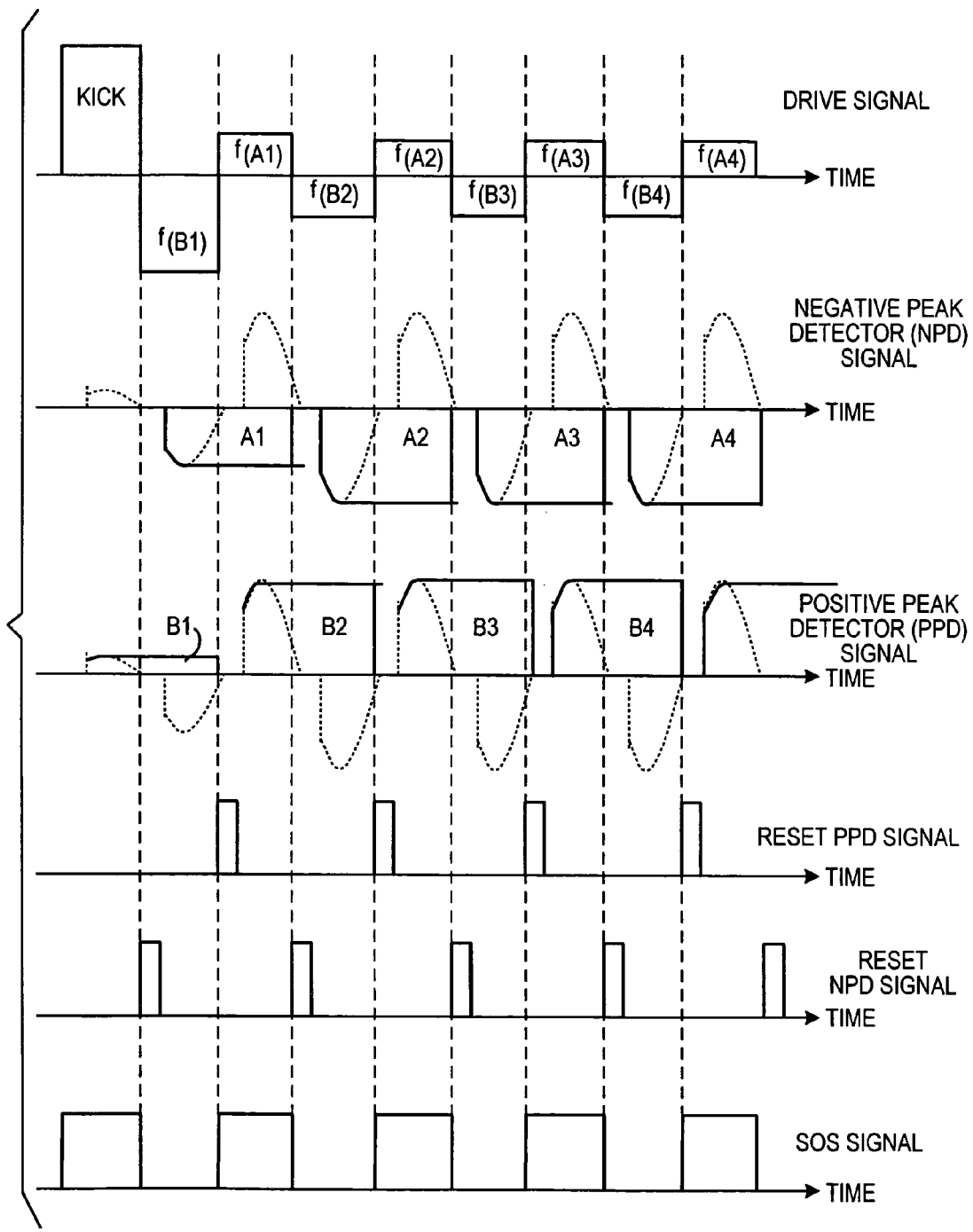
FIG. 6 is a series of signals generated in the circuit of FIG. 5.

The drive circuit 244 is shown in its entirety in FIG. 5, with explanatory signal waveforms depicted in FIG. 6. A motor drive front end circuit 100 depicted in FIG. 5 is shown in more detail in FIG. 3, with explanatory signal waveforms depicted in FIG. 4. The drive circuit 244 is advantageously implemented in an application specific integrated circuit (ASIC) 250 which, together with the microprocessor 246, constitute the signal processing circuitry 228.

As previously mentioned, a square wave drive signal is conducted to the drive coil 240 to cause the scan mirror 236 to oscillate. At the same time, the jointly mounted magnet 248 oscillates and generates a feedback signal in the feedback coil 242. Crosstalk between the coils 240, 242 only occurs at the amplitude changes of the square wave drive signal, that is, at its vertical edge transitions. The resulting corrupted feedback signal is shown in FIG. 4 and is conducted to the track and hold circuit 102 having a capacitor 104. An edge-triggered one shot circuit 106 is operatively connected to a switch 108 in the track and hold circuit. The output of the track and hold circuit is conducted to an adjustable gain amplifier 110 whose output is conducted through a DC voltage offset adjustment circuit 112. The output of the adjustment circuit 112 is connected to a zero crossing detector 114 operative for detecting zero crossings in the feedback signal and for generating the aforementioned SOS signal. The output of the zero crossing detector is connected to the one shot circuit 106.

In operation, the track and hold circuit 102 monitors the corrupted feedback signal whose voltage is used to charge the capacitor 104. At each zero crossing of the feedback signal, the one shot circuit 106 is triggered to generate the command signal. The command signal opens the switch 108 at each zero crossing, effectively removing the crosstalk present at each zero crossing in a discrete time signal processing technique. The uncorrupted feedback signal shown in FIG. 4 has the same general shape as the corrupted feedback signal, except the crosstalk at each zero crossing has been removed. This does not result in any loss of information because the zero crossings are still present and they represent the frequency of the feedback signal. Also, the voltage peaks of the feedback signal are still present and they represent the magnitude of the scan angle through which the scan mirror is oscillated.

As also depicted in FIG. 4, during the initial start-up of the drive motor, that is prior to reaching the steady-state condition, the voltage of the peaks of the uncorrupted feedback signal successively increases, while the corresponding magnitude of the square waves of the drive signal successively decrease. The magnitude of the square waves only changes at SOS boundaries, that is, at the zero crossings.

Turning again to FIG. 5, the uncorrupted feedback signal from the front end circuit 100 is connected in a negative feedback loop to a positive peak detector (PPD) 116 and a negative peak detector (NPD) 118. The peak outputs of the PPD and NPD are conducted to negative inputs of error amplifiers 120, 122. Positive and negative reference voltages are conducted to the positive inputs of the error amplifiers. The outputs of the error amplifiers are connected to a commutator switch 124 under the control of the SOS signal. The output of the switch 124 is conducted back to the drive coil 240 via a kick signal switch 126, and a push-pull drive having an inverter 128 and an amplifier 130 in one branch is connected to one end of the drive coil 240, and an amplifier 132 in another branch is connected to the opposite end of the drive coil 240.

Timing circuits 134 are used to generate a kick signal for the kick switch 126, a reset NPD signal to reset the NPD 118, a reset PPD signal to reset the PPD 116, and the SOS signal to control the commutator switch 124. All of these signals are depicted in FIG. 6.

In operation, the uncorrupted feedback signal from the front end circuit 100 is processed to produce a square wave drive signal. More particularly, the uncorrupted feedback signal is peak detected by the PPD and the NPD and compared to a fixed reference value. The result of this comparison is a PPD signal and an NPD signal which closely resemble a square wave at the outputs of the error amplifiers. The switch 124 is switched in synchronism with the SOS signal, to produce a more ideal square wave drive signal that is in proportion to the amplitude error that was detected by the respective error amplifier during the previous SOS state. In other words, a correction during a current SOS state is made based on the voltage peak detected during the previous SOS state. Each of the PPD and the NPD is reset on alternate SOS edges so that new information can be evaluated.

Referring again to FIG. 6, the first pulse labeled "kick" of the drive signal that is delivered to the drive coil via kick switch 126 is generated by timing circuits 134 and does not depend on feedback information. The second pulse labeled $f_{(B1)}$ is derived from evaluating peak velocity information B1 that was acquired during the previous SOS period while the motor was being kicked. The magnitude of $f_{(B1)}$ is determined by the corresponding error amplifier 120 or 122. The third pulse labeled $f_{(A1)}$ is derived from evaluating peak velocity information A1 that was acquired during the previous SOS period. Successive pulses are processed in the same way. The drive signal has a 50% duty cycle synchronized to the SOS signal.

It will be understood that each of the elements described above, or two or more together, also may find a useful application in other types of constructions differing from the types described above.

While the invention has been illustrated and described as embodied in a motor drive arrangement for and a method of generating a drive signal with reduced coil crosstalk in a feedback signal, especially for use in an electro-optical reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters patent is set forth in the appended claims.

We claim:

1. A motor drive circuit in a light scanning arrangement, comprising:
   a) a drive coil driven by a drive signal to oscillate a scan mirror and a light beam reflected from the scan mirror;
   b) a feedback coil for generating a feedback signal having zero crossings during oscillation of the scan mirror, the feedback coil being in proximity to the drive coil and being corrupted by cross-coupling between the coils at each zero crossing;
   c) circuitry for minimizing the cross-coupling at each zero crossing to generate an uncorrupted feedback signal; and
   d) circuitry for processing the uncorrupted feedback signal to generate the drive signal as a square wave having vertical edges respectively corresponding to the zero crossings.

2. The motor drive circuit of claim 1, wherein the scan mirror has a permanent magnet mounted thereon for joint oscillation therewith, and wherein the square wave drive signal generates an electromagnetic field which interacts with a permanent magnetic field of the magnet to oscillate the mirror and the magnet in opposite drive directions at a drive frequency.

3. The motor drive circuit of claim 2, wherein the feedback signal has a feedback frequency corresponding to the drive frequency of the drive signal.

4. The motor drive circuit of claim 1, wherein the minimizing circuitry includes a track and hold circuit having a capacitor charged by the corrupted feedback signal, and a switch opened at each zero crossing to remove the cross-coupling at each zero crossing.

5. The motor drive circuit of claim 4, wherein the minimizing circuitry includes a zero crossing detector for detecting each zero crossing, and a one-shot circuit for generating a command signal to open the switch at each detected zero crossing.

6. The motor drive circuit of claim 1, wherein the processing circuitry includes a positive peak detector and a negative peak detector having inputs to which the uncorrupted feedback signal is conducted, and having outputs from which positive and negative peak voltages are conducted to first terminals of error amplifiers, the error amplifiers having second terminals connected to positive and negative reference voltages.

7. The motor drive circuit of claim 6, wherein the error amplifiers have outputs connected to a commutator switch which is switched between the outputs of the error amplifiers to generate the square wave drive signal.

8. A method of driving a motor in a light scanning arrangement, comprising the steps of:
   a) driving a drive coil with a drive signal to oscillate a scan mirror and a light beam reflected from the scan mirror;
   b) generating a feedback signal having zero crossings during oscillation of the scan mirror by a feedback coil in proximity to the drive coil, the feedback coil being corrupted by cross-coupling between the coils at each zero crossing;
   c) minimizing the cross-coupling at each zero crossing to generate an uncorrupted feedback signal; and
   d) processing the uncorrupted feedback signal to generate the drive signal as a square wave having vertical edges respectively corresponding to the zero crossings.

9. The method of claim 8, and the step of mounting a permanent magnet on the scan mirror for joint oscillation therewith, and wherein the square wave drive signal generates an electromagnetic field which interacts with a permanent magnetic field of the magnet to oscillate the mirror and the magnet in opposite drive directions at a drive frequency.

10. The method of claim 9, wherein the feedback signal has a feedback frequency corresponding to the drive frequency of the drive signal.

11. The method of claim 8, wherein the minimizing step is performed by charging a capacitor with the corrupted feedback signal, and by opening a switch at each zero crossing to remove the cross-coupling at each zero crossing.

12. The method of claim 11, wherein the minimizing step is performed by detecting each zero crossing, and by generating a command signal to open the switch at each detected zero crossing.

13. The method of claim 8, wherein the processing step is performed by detecting positive and negative voltage peaks in the uncorrupted feedback signal, and by comparing the positive and negative voltage peaks with reference voltages to obtain positive and negative signals.

14. The method of claim 13, wherein the processing step is performed by switching a commutator switch between the positive and negative signals to obtain the square wave drive signal.

* * * * *